(12) United States Patent  (10) Patent No.: US 8,671,153 B1
Chu  (45) Date of Patent: Mar. 11, 2014

(54) LOW COST, HIGH PERFORMANCE AND HIGH DATA THROUGHPUT SERVER BLADE

(75) Inventor: William W. Y. Chu, Los Altos, CA (US)

(73) Assignee: Acqis LLC, McKinney, TX (US)

( * ) Notice: Subject to any disclaimer, the term of this patent is extended or adjusted under 35 U.S.C. 154(b) by 311 days.

(21) Appl. No.: 13/214,020

(22) Filed: Aug. 19, 2011

Related U.S. Application Data (60) Provisional application No. 61/375,356, filed on Aug. 20, 2010.

(51) Int. Cl.
*G06F 15/167* (2006.01)
*G06F 13/14* (2006.01)

(52) U.S. Cl.
USPC .......................................... 709/213; 710/305

(58) Field of Classification Search
USPC .......................................... 709/213; 710/305
See application file for complete search history.

(56) References Cited

U.S. PATENT DOCUMENTS

| | | |
|---|---|---|
| 5,086,499 A | 2/1992 | Mutone |
| 5,638,521 A | 6/1997 | Buchala et al. |
| 5,640,302 A | 6/1997 | Kikinis |
| 5,689,654 A | 11/1997 | Kikinis et al. |
| 5,721,842 A | 2/1998 | Beasley et al. |
| 5,764,924 A | 6/1998 | Hong |
| 5,815,681 A | 9/1998 | Kikinis |
| 5,978,919 A | 11/1999 | Doi et al. |
| 5,999,952 A | 12/1999 | Jenkins et al. |
| 6,025,989 A | 2/2000 | Ayd et al. |
| 6,029,183 A | 2/2000 | Jenkins et al. |
| 6,038,621 A | 3/2000 | Gale et al. |
| 6,069,615 A | 5/2000 | Abraham et al. |
| 6,157,534 A | 12/2000 | Gallagher et al. |
| 6,161,157 A | 12/2000 | Tripathi |
| 6,161,524 A | 12/2000 | Akbarian et al. |
| 6,202,169 B1 | 3/2001 | Razzaghe-Ashrafi et al. |
| 6,216,185 B1 | 4/2001 | Chu |
| 6,304,895 B1 | 10/2001 | Schneider et al. |
| 6,311,268 B1 | 10/2001 | Chu |
| 6,314,522 B1 | 11/2001 | Chu |
| 6,321,335 B1 | 11/2001 | Chu |
| 6,332,180 B1 | 12/2001 | Kauffman et al. |
| 6,345,330 B2 | 2/2002 | Chu |
| 6,366,951 B1 | 4/2002 | Schmidt |
| 6,378,009 B1 | 4/2002 | Pinkston, II et al. |

(Continued)

OTHER PUBLICATIONS

Hughes et al., BladeCenter processor blades, I/O expansion adapters and units, pp. 837-859, 2005.*

*Primary Examiner* — Larry Donaghue
(74) *Attorney, Agent, or Firm* — Cooley LLP (57) ABSTRACT

A server blade insertable into a chassis of a blade server system includes a main circuit board coupled to the chassis upon insertion, a plurality of connectors residing on the main circuit board, a plurality of grouped hard disk drives, and a plurality of computer modules, each insertable into a corresponding one of the connectors. Each of the grouped hard disk drives couples to one or more of the computer modules. Each of the grouped hard disk drives includes a first hard disk drive exposed proximate to a front side of the chassis, and a second hard disk drive positioned between the first hard disk drive and a back side of the chassis. A subset of the grouped hard disk drives includes a first grouped hard disk drive and a second grouped hard disk drive stacked on the first grouped hard disk drive.

5 Claims, 4 Drawing Sheets

(56) References Cited

U.S. PATENT DOCUMENTS

| | | | |
|---|---|---|---|
| 6,401,124 B1 | 6/2002 | Yang et al. | |
| 6,430,000 B1 * | 8/2002 | Rent | 360/99.25 |
| 6,452,790 B1 | 9/2002 | Chu | |
| 6,453,344 B1 | 9/2002 | Ellsworth et al. | |
| 6,549,966 B1 | 4/2003 | Dickens et al. | |
| 6,643,777 B1 | 11/2003 | Chu | |
| 6,718,415 B1 | 4/2004 | Chu | |
| 7,099,981 B2 | 8/2006 | Chu | |
| 7,146,446 B2 | 12/2006 | Chu | |
| 7,328,297 B2 | 2/2008 | Chu | |
| 7,363,415 B2 | 4/2008 | Chu | |
| 7,363,416 B2 | 4/2008 | Chu | |
| 7,376,779 B2 | 5/2008 | Chu | |
| RE41,076 E | 1/2010 | Chu | |
| RE41,092 E | 1/2010 | Chu | |
| 7,676,624 B2 | 3/2010 | Chu | |
| RE41,294 E | 4/2010 | Chu | |
| 7,818,487 B2 | 10/2010 | Chu | |
| 7,822,895 B1 * | 10/2010 | Sardella et al. | 710/104 |
| RE41,961 E | 11/2010 | Chu | |
| RE42,814 E | 10/2011 | Chu | |
| 8,041,873 B2 | 10/2011 | Chu | |
| RE42,984 E | 11/2011 | Chu | |
| RE43,119 E | 1/2012 | Chu | |
| RE43,171 E | 2/2012 | Chu | |
| 8,234,436 B2 | 7/2012 | Chu | |
| 2001/0011312 A1 | 8/2001 | Chu | |
| 2004/0177200 A1 | 9/2004 | Chu | |
| 2005/0174729 A1 | 8/2005 | Chu | |
| 2005/0182882 A1 | 8/2005 | Chu | |
| 2005/0195575 A1 | 9/2005 | Chu | |
| 2005/0204083 A1 | 9/2005 | Chu | |
| 2005/0246469 A1 | 11/2005 | Chu | |
| 2006/0265361 A1 | 11/2006 | Chu | |
| 2008/0244149 A1 | 10/2008 | Chu | |
| 2009/0083813 A1 * | 3/2009 | Dolce et al. | 725/93 |
| 2009/0157939 A1 | 6/2009 | Chu | |
| 2009/0268390 A1 * | 10/2009 | King et al. | 361/679.33 |
| 2010/0174844 A1 | 7/2010 | Chu | |
| 2011/0007473 A1 * | 1/2011 | Franz et al. | 361/679.33 |
| 2011/0208893 A1 | 8/2011 | Chu | |

\* cited by examiner

LOW COST, HIGH PERFORMANCE AND HIGH DATA THROUGHPUT SERVER BLADE

CROSS-REFERENCE TO RELATED APPLICATION

This application claims priority to U.S. Provisional Application Ser. No. 61/375,356, filed on Aug. 20, 2010, which is incorporated by reference in its entirety.

FIELD OF THE INVENTION

The present invention relates generally to computer servers and processing. More particularly, the invention relates to low cost, high performance, and high data throughput server blades.

BACKGROUND OF THE INVENTION

As processing power, memory capacity, and data bandwidth increases, there are limitations on computing efficiency under a single operating system (OS) instance. In the server space, one answer has been virtualization, which allows many OS instances to share the resources of a few large physical servers. However, for many consumers, this high level of computing power may not be necessary. Smaller processors that provide good performance at lower cost can be used to disaggregate the OS instances onto many smaller servers, a concept called physicalization that can be an alternative to virtualization for smaller data centers.

Certain server applications, such as video streaming, may be suitable for physicalization due to relatively high input/output (I/O) bandwidth requirements coupled with relatively low processing power requirements. However, existing blade servers based on virtualization may not be well suited for these applications, as these blade servers may have higher processing power than needed along with limited I/O bandwidth across the few large physical servers. In addition, the cost of processors and system components for traditional server applications tends to decrease more slowly than the cost of processors and components for high volume consumer applications. Thus, there remains a need in the blade server space for compact, low cost, high data throughput computer modules that incorporate highly integrated consumer processors and system components for applications such as video streaming.

It is against this background that a need arose to develop the server blade described herein.

SUMMARY OF THE INVENTION

One aspect of the invention relates to a server blade. In one embodiment, a server blade insertable into a chassis of a blade server system comprises: (1) a main circuit board coupled to the chassis upon insertion; (2) a plurality of connectors residing on the main circuit board; (3) a plurality of grouped hard disk drives; and (4) a plurality of computer modules, each insertable into a corresponding one of the plurality of connectors. Each of the plurality of grouped hard disk drives couples to one or more of the plurality of computer modules. Each of the plurality of grouped hard disk drives includes a first hard disk drive exposed proximate to a front side of the chassis, and a second hard disk drive positioned between the first hard disk drive and a back side of the chassis. A first subset of the plurality of grouped hard disk drives includes a first grouped hard disk drive and a second grouped hard disk drive stacked on the first grouped hard disk drive.

In another embodiment, the server blade insertable into the chassis of the blade server system comprises: (1) a main circuit board that couples to the chassis upon insertion; (2) a plurality of computer modules; (3) a plurality of connectors residing on the main circuit board, each adapted to connect to a corresponding one of the plurality of computer modules; and (4) a plurality of hot-plug hard drive storage modules, each removable from a front side of the server blade while the server blade is installed in the chassis. Each of the plurality of hot-plug hard drive storage modules comprises a frame, a first hard disk drive attached to a front portion of the frame, and a second hard disk drive attached to a rear portion of the frame. Each of the first hard disk drive and the second hard disk drive are coupled to at least one of the plurality of computer modules.

In another embodiment, the server blade insertable into the chassis of the blade server system comprises: (1) a main circuit board coupled to the chassis upon insertion; (2) a plurality of connectors disposed on the main circuit board; (3) a plurality of computer modules, each insertable into a corresponding one of the plurality of connectors; and (4) a hub disposed on the main circuit board that couples to the chassis and to a communication controller included in each of the plurality of computer modules. The hub processes input data to obtain requests distributed to the plurality of computer modules, each of the plurality of computer modules generates an output data stream in response to a corresponding request, each output data stream has a first bandwidth higher than a second bandwidth of the corresponding request, and the hub aggregates the output data streams of the plurality of computer modules to obtain output data.

DETAILED DESCRIPTION OF THE INVENTION

Processors designed for use in high volume consumer applications can provide a higher performance per cost than processors designed for low volume, high performance server applications. In addition, aggressive competition in high volume consumer computer systems can drive cost of processors and components for consumer applications down more rapidly than that of high end server processors and components. Embodiments of the invention include low cost computer modules incorporating these highly integrated consumer processors and system components, and at the same time take advantage of blade server design concepts. The use of a large number of these low cost computer modules within a blade server system for certain server applications, such as video streaming applications, can result in reduced cost and increased performance.

Figure 1:
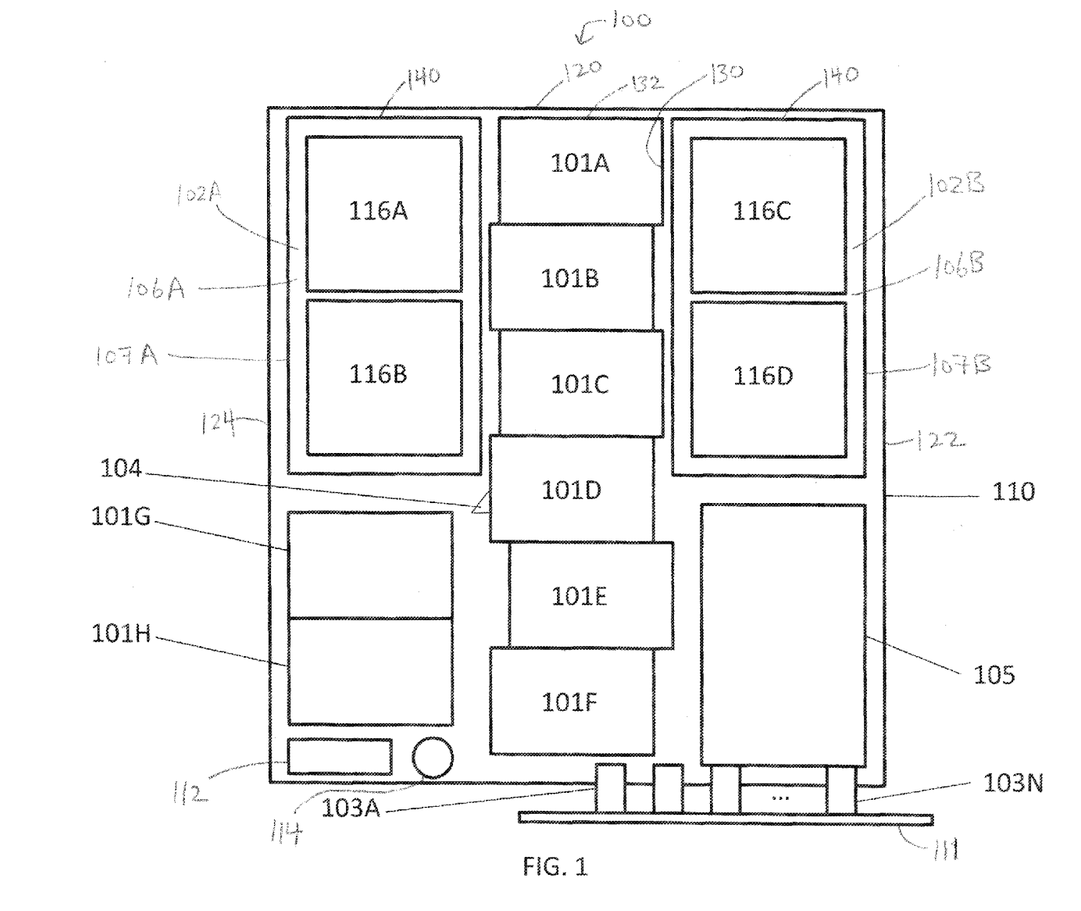
FIG. 1 illustrates a top view of a server blade, according to an embodiment of the invention.

Referring to FIG. 1, a top view of a server blade 100 according to an embodiment of the invention is illustrated. The server blade 100 includes a main circuit board 110 that can couple to a chassis. For example, the main circuit board 110 can insert into connectors 103A-103N coupled to a backplane or midplane 111. Computer modules 101 (101A-101H in the illustrated embodiment) are electrically connected to the main circuit board 100, such as by inserting into connectors (see FIG. 2) on the main circuit board 110. The computer modules 101 are coupled to a management controller 112. In one embodiment, a mezzanine plug-on card 105 is disposed on the main circuit board 110. The mezzanine plug-on card 105 can also insert into one or more connectors 103 to the backplane or midplane 111.

For high volume video-streaming server applications, sufficient hard disk drive data bandwidth and corresponding network bandwidth is specified at each of the computer modules 110 to support a large number of real-time video streams. The hard disk drive data bandwidth can be provided by coupling each of the computer modules 110 to a corresponding hard disk drive 116 disposed on the server blade 100. In one embodiment, each of the hard disk drives 116 is coupled to a corresponding one of the computer modules 110 through a high speed SATA (Serial Advanced Attachment Technology) Rev. 2 interface. An input/output (IO) hub 324 (see FIG. 3) included in the computer module 110 may provide one SATA interface port. The SATA interface port included in the computer module 110 can connect through connectors and the main circuit board 110 to the corresponding hard disk drive 116. As SATA Rev. 2 can support 2.4 Gb/s of actual transfer rate, and as conventional hard disk drives typically can saturate the original SATA 1.5 Gb/s bandwidth, the bandwidth requirements of each of the computer modules 110 can be met by the corresponding one of the hard disk drives 116 over the SATA Rev. 2 interface, and by corresponding switching bandwidth (see discussion with reference to FIG. 4). In this embodiment, the effective data bandwidth per computer module 110 can be approximately 150 Mbyte/s.

Figure 2:
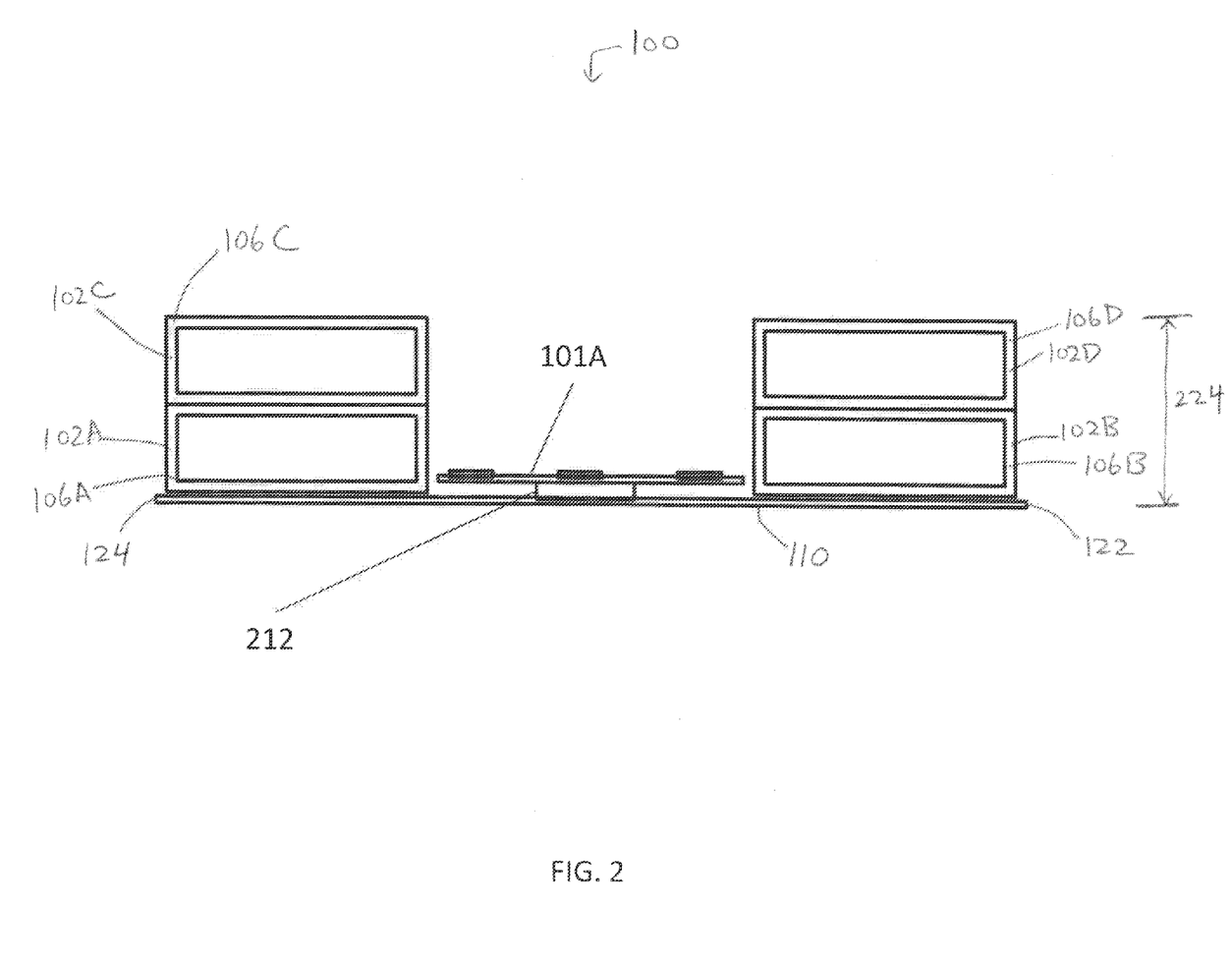
FIG. 2 illustrates a front view of a server blade, according to an embodiment of the invention.

Referring to FIGS. 1 and 2, to increase the effective data bandwidth per server blade 100, it may be desirable to increase the number of computer modules 110 and corresponding hard disk drives 116 per server blade 100. At the same time, it may be desirable to design the server blade 100 to comply with industry standards. For example, the Server System Infrastructure (SSI) Forum has provided mechanical, electrical, and power specifications for a standardized server blade. These specifications include a 407.9 mm blade depth (corresponding to a length of lateral sides 122 and 124 of the server blade 100, shown in FIG. 1), a 279.4 mm blade width (corresponding to a length of front side 120 of the server blade 100, shown in FIG. 1), a 41.7 mm blade height (corresponding to a height 224 of the server blade 100, shown in FIG. 2), and a maximum power of 450 Watts. In one embodiment, the front side 120 of the server blade 100 corresponds to a front side of the main circuit board 110, and the lateral sides 122 and 124 of the server blade 100 corresponds to lateral sides of the main circuit board 110.

It can be advantageous to design the server blade 100 to increase the number of computer modules 110 and corresponding hard disk drives 116 per server blade 100, taking into account limitations on blade size associated with mechanical specifications for server blades such as those of SSI, and other considerations such as airflow paths for cooling and operational requirements. In one embodiment, a first side 130 of each computer module 101 has a length of approximately 62 mm, and a second side 132 of each computer module 101 has a length of approximately 86 mm. As shown in FIG. 1, and in an embodiment corresponding to the SSI mechanical specifications, eight computer modules 101A-101H can be coupled to the server blade 100. The second side 132 of the computer module 101A is positioned adjacent to the front side 120 of the server blade 100 so that there is a path for front-to-back airflow over the computer modules 101. In this embodiment, there is then sufficient space along the front side 120 of the server blade 100 to dispose two hard disk drives 116A and 116C of typical dimensions adjacent to the front side 120.

In one embodiment, each pair of hard disk drives 116 is included in a corresponding grouped hard disk drive 102. This structural arrangement is to overcome the limited front surface area of the server blade 100. For example, grouped hard disk drive 102A includes the hard disk drives 116A and 116B, and grouped hard disk drive 102B includes the hard disk drives 116C and 116D. The grouped hard disk drives 102 may be oriented such that the hard disk drives 116A and 116C are exposed proximate to the front side 120 of the server blade 100, and therefore proximate to a front side of the chassis to which the server blade 100 is coupled. In one embodiment, the hard disk drives 116A and 116C may be exposed at the front side of the chassis to which the server blade 100 is coupled. The hard disk drive 116B may be positioned between the hard disk drive 116A and a back side of the chassis to which the server blade 100 is coupled, and the hard disk drive 116D may be positioned between the hard disk drive 116C and a back side of the chassis to which the server blade 100 is coupled. By orienting the grouped hard disk drives 102A and 102B in this way, four hard disk drives 116 can be positioned adjacent to the main circuit board 110.

In addition, referring to FIG. 2, a front view of the server blade 100 according to an embodiment of the invention is illustrated. In one embodiment, a grouped hard disk drive 102C may be stacked on the grouped hard disk drive 102A, and a grouped hard disk drive 102D may be stacked on the grouped hard disk drive 102B. The grouped hard disk drives 102C and 102D may be oriented similarly to the grouped hard disk drives 102A and 102B, respectively. In this way, eight hard disk drives 116 can be included in the blade server 100 while maintaining the front-to-back airflow path over the computer modules 101, and while staying within the SSI specifications for blade height. Note that for typical hard disk drive sizes, an SSI specified server blade can expose at most four hard disk drives 116, in two stacks of two, at the front side 120 of the main circuit board 110. In one embodiment, eight hard disk drives 116 may be used to support eight computer modules 101 (one hard disk drive 116 per computer module 101). This can yield an aggregate hard disk drive data bandwidth of up to 1.5 Gbyte/s with eight hard disk drives 116 concurrently being accessed by eight corresponding computer modules 101. Alternatively, eight hard disk drives 116 may be used to support four computer modules 101 (for example, the two hard disk drives 116 in one of the grouped hard disk drives 102 per computer module 101).

Referring to FIG. 1, the grouped hard disk drives 102 may correspond to hot-plug hard drive storage modules 106 that are removable from the front side 120 of the server blade 100. In one embodiment, a hot-plug hard drive storage module 106 includes a grouped hard disk drive 102, and is positioned similarly on the main circuit board 110. Frames 107 can be attached to the main circuit board 110, and each of the hot-plug hard drive storage modules 106 may be adapted to be placed in a corresponding one of the frames 107. Each of the hot-plug hard drive storage modules 106 may include a first hard disk drive (such as hard disk drives 116A and 116C) disposed in a front portion of the frame 107 adjacent to the front side 120 of the server blade 100, and may include a second hard disk drive (such as hard disk drives 116B and 116D) disposed in a rear portion of the frame 107. In one embodiment, each of the hot-plug hard drive storage modules 106 includes a connector that supports two SATA connections for the two hard disk drives 116 to connect to one or two computer modules 101 via the main circuit board 110. In addition, referring to FIG. 2, in one embodiment a hot-plug hard drive storage module 106C may be stacked on the hot-plug hard drive storage module 106A, and a hot-plug hard drive storage module 106D may be stacked on the hot-plug hard drive storage module 106B.

Referring to FIG. 1, at least one of the computer modules 101 may be positioned between the grouped hard disk drive 102A and the grouped hard disk drive 102B. The grouped hard disk drive 102A may be positioned proximate to the lateral side 124 of the server blade 100, and the grouped hard disk drive 102B may be positioned proximate to the lateral side 122 of the server blade 100. This can allow airflow from the front side of the chassis to pass between the grouped hard disk drive 102A and the grouped hard disk drive 102B, so that the front-to-back airflow passes over the computer modules 101A-101F. In one embodiment, an air baffle 104 disposed on the main circuit board 110 is positioned to direct the front-to-back airflow toward the lateral side 124 of the server blade 100. In this way, airflow can be provided for cooling the computer modules 101G-101H, which are positioned at least partially behind the grouped hard disk drive 102A. In this embodiment, the front-to-back airflow is substantially centrally positioned over the main circuit board 110. This may facilitate efficient direction of the airflow toward the computer modules 101G and 101H adjacent to the lateral side 124 of the server blade 100.

Alternatively, the grouped hard disk drive 102A may be positioned next to the grouped hard disk drive 102B, such that the computer module 101A is positioned adjacent to either the lateral side 122 or the lateral side 124 of the server blade 100. In this embodiment, the front-to-back airflow is substantially laterally positioned over the main circuit board 110.

In one embodiment, operational status indicators of the hard disk drives 116 that are displaced from the front side 120 of the main circuit board 110 (such as the hard disk drives 116B and 116D) can be provided at a front side 140 of the corresponding grouped hard disk drives 102. For example, a visual indicator (such as an LED indicator) that the hard disk drive 116B is operating may be provided at the front side 140 of the grouped hard disk drive 102A, along with a visual indicator that the hard disk drive 116A is operating.

Figure 3:
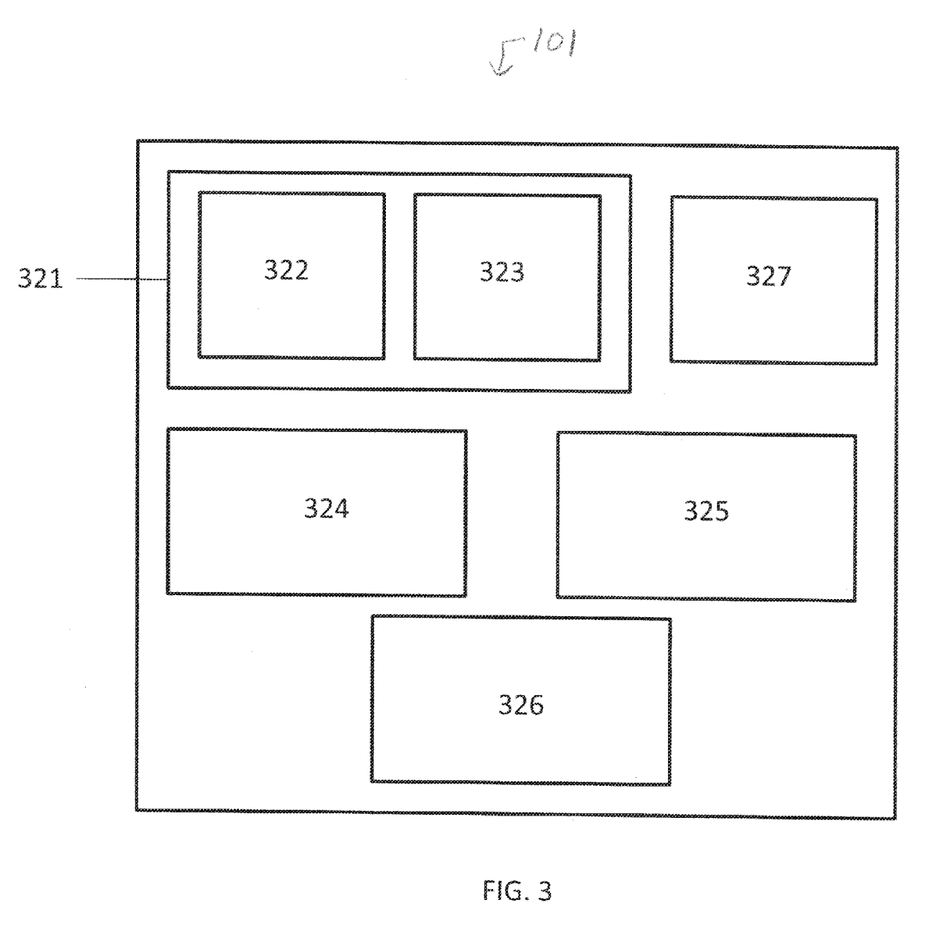
FIG. 3 illustrates a logical view of a computer module, according to an embodiment of the invention.

Referring to FIGS. 1 and 3, a processor 322 (see FIG. 3) on each of the computer modules 101 may communicate serially (such as via I²C) with the management controller 112 on the main circuit board 110. The management controller 112 can monitor the operational status of the processors 322. If processor failure is detected, the management controller 112 can alert an administrator. Information such as temperature, identification of the computer module 101, and size of memory or storage device can also be communicated serially to the management controller 112. A power switch controlled by the management controller 112 can shut off power to any one of the computer modules 101. If a failed computer module 101 is detected, the management controller 112 can alert high level software to shift the workload of the failed computer module 101 to another computer module 101, and subsequently shut off its power so that the failed computer module 101 does not affect the operation of the rest of the server blade 100. In one embodiment, the management controller 112 supports at least one of 1:1, 1+1, and N+1 redundancy of the computer modules 101. Alternatively or in addition, the management controller 112 can support load-balancing between two or more of the computer modules 101.

In one embodiment, a battery 114 on the main circuit board 110 can provide power to each of the computer modules 101 for maintaining data in memory, such as a static CMOS memory, or for keeping a portion of circuitry on each of the computer modules 101 active when the remainder of the circuitry on the computer modules 101 is powered down. The power from the battery 114 can be kept on even if the main power to one or more of the computer modules 101 is shut off by the management controller 112 for saving power when the one or more of the computer modules 101 are not in use. In one embodiment, two batteries 114 can reside on the main circuit board 110 so that battery power is continuously available during replacement of one of the two batteries 114.

Embodiments of the present invention can use different numbers of computer modules 101 to populate the server blade 100. Other embodiments can use server blades 100 of different form factors, electrical, and power specifications. An embodiment of the present invention uses plug-in computer modules 101 to simplify manufacturing and facilitate ease of repair. In this embodiment, if a computer module 101 fails, only the failed computer module 101 needs to be unplugged and replaced, saving the rest of the server blade 100. This also allows the server blade 100 to be populated partially with computer modules 101, with the option of plugging in additional computer modules 101 later.

Referring to FIG. 2, the grouped hard disk drives 102A and 102C may be proximate to the lateral surface 124 of the server blade 100, and the grouped hard disk drives 102B and 102D may be proximate to the lateral surface 122 of the server blade 100. The computer module 101A may be positioned between the grouped hard disk drive 102A and the grouped hard disk drive 102B. In one embodiment, a connector 212 is disposed on the main circuit board 110. The computer module 101A is insertable into the connector 212, which is adapted to connect to the computer module 101A, and to couple the computer module 101A to the main circuit board 110. In one embodiment, the connector 212 may be a vertical connector. There is a similar connector (not shown) corresponding to each of the computer modules 101 that is adapted to couple the corresponding one of the computer modules 101 to the main circuit board 110.

Referring to FIG. 3, a logical view of the computer module 101 according to an embodiment of the invention is illustrated. The computer module 101 includes an integrated system on chip 321 comprising a processor 322 and a memory controller 323, a main memory 327 coupled to the memory controller 323, an input/output hub 324, a communication controller 325, and a mass storage device 326. In one embodiment, the main memory 327 is directly coupled to the memory controller 323.

Referring to FIGS. 1-3, in one embodiment, the computer module 101 is low in height to fit within the SSI height limitation of 41.7 mm. It is contemplated that the computer module 101 may be of even lower height. One embodiment of the present invention uses a horizontally fitted double data rate (DDR) DDR2/3 small outline dual in-line memory module (SODIMM) as the main memory 327 within the computer module 101 to meet the SSI height limitation. The SODIMM memory may be a plug-in unit to improve reusability. Another embodiment uses DDR2/3 Micro-DIMM as the main memory 327 to reduce the size of the computer module 101. To reduce power consumption, embodiments of the invention can use low power double data rate (LPDDR) LPDDR2 memory or future generations of low power DDR memory with low voltage swing low-voltage differential signaling (LVDS) data links. In one embodiment, the processor 322 may be a low power processor or system chip, e.g., system on chip (SOC), that can operate with a low profile top mounted heat sink to fit within the SSI height limitation. The low profile heat sink can be sufficient for air cooling for low power system chips. The computer module 101 can be a small printed circuit board populated on both sides with major components such as a system chip, the input/output hub 324, a SODIMM memory horizontal socket, the connector 212 (see FIG. 2) to the main circuit board 110 of the server blade 100 (see FIG. 1), and a USB or SATA flash drive as the mass storage device 326. The flash drive may be a plug-in unit to improve reusability. The system chip can be soldered directly on the small printed circuit board to reduce cost and to remove the additional height of an expensive socket. Without the socket, the top mounted heat sink can increase in height to increase cooling for the system chip.

In one embodiment, the computer module 101 includes one USB flash drive or one solid state drive (SSD). USB 3.0 released in 2008 has a signaling rate of 4.8 Gbit/sec versus 480 Mbit/s for USB 2.0. In one embodiment, a USB 3.0 flash drive interfaces to the input/output hub 324 or the processor 322 in the computer module 101. In another embodiment, a USB flash drive or a SATA SSD can serve as local cache on the computer module 101 to store frequently accessed content and video streams. USB 3.0 connections can have an effective data bandwidth of over 2.4 Gb/s or 300 MByte/s. A single SATA SSD can yield an effective data bandwidth of around 150 to 300 MByte/s. In one embodiment, the computer module 101 includes a flash drive or a local SSD as cache. This can provide a higher storage data bandwidth than the hard disk drives 116 included in the server blade 100 (see FIG. 1). In other embodiments, two USB flash drives or 2 SATA SSDs can be included in a single computer module 101 to further increase data bandwidth. Either the USB flash drive or the SATA SSD can be used to store operating system or virtualization software to allow the computer module 101 to boot up upon power up.

Figure 4:
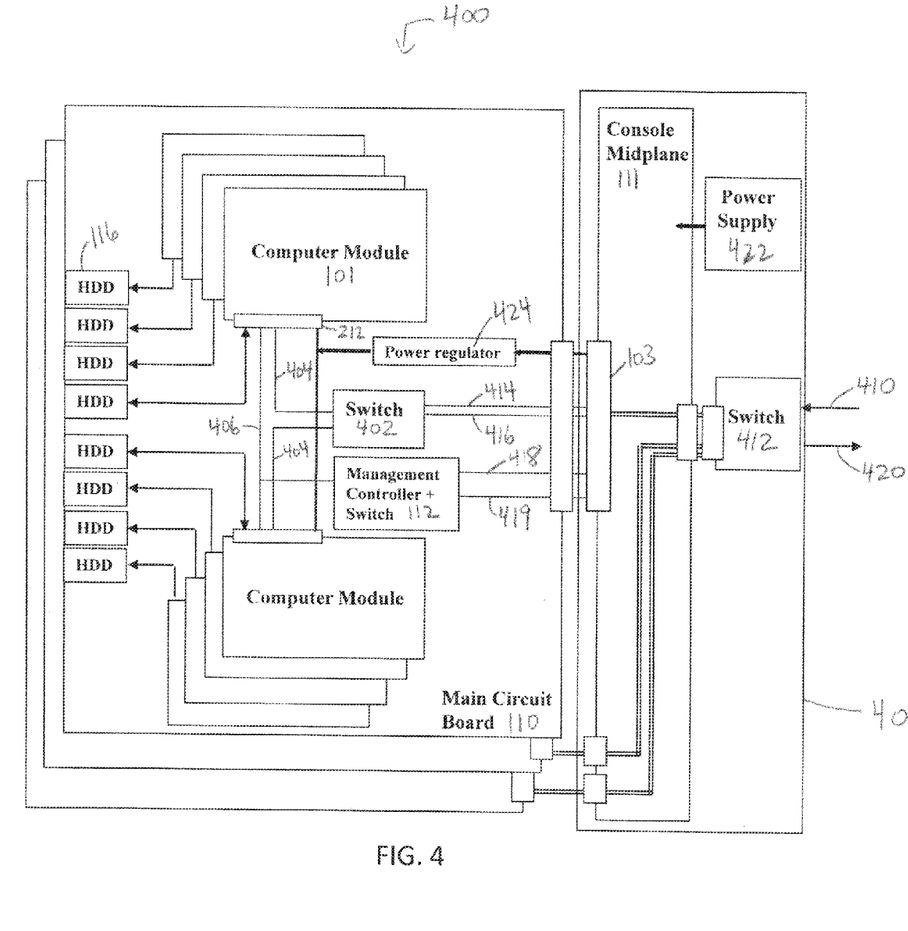
FIG. 4 illustrates a logical view of a blade server system, according to an embodiment of the invention.

Referring to FIG. 4, a logical view of a blade server system 400 according to an embodiment of the invention is illustrated. One or more main circuit boards 110 couple to a chassis 401 upon insertion into connectors 103 of the midplane or backplane 111. The circuit boards 110 can be powered, at least in part, by the power supply 422. The computer modules 101 each insert into a corresponding connector 212, and are each coupled to a hard disk drive 116. The computer modules 101 can be powered, at least in part, by the power supply 422 via the power regulator 424.

Referring to FIGS. 3 and 4, in one embodiment, a hub 402 on the main circuit board 110 couples to the communication controller 325 on each of the computer modules 101. The hub 402 can include switches such as an Ethernet switch or a PCI Express switch. Similarly, the hub 412 can include switches such as a 10 Gigabit Ethernet (10 GbE) switch or a PCI Express switch.

In one embodiment, two 1 Gigabit Ethernet (GbE) connections are provided from each computer module 101 to the main circuit board 110. The two GbE connections can provide approximately 200 Mbyte/s of network bandwidth. These GbE links from each computer module 101 connect to the Ethernet switching hub 402 on the main circuit board 110 with separate connections. The Ethernet switch 402 can have 16 GbE ports and 2 10 GbE ports. The 10 GbE ports can connect to the 10 GbE switch 412 within the console midplane 111.

Referring to FIGS. 3 and 4, in another embodiment, high speed PCI Express channels are provided from either the system chip 321 or the input/output hub 325 to provide data communication to the main circuit board 110, and eventually to an external network. PCI Express 2.0 can have an effective 400 Mbyte/s per link data throughput. PCI Express 3.0 can have an effective per link data throughput about twice that of PCI Express Rev. 2.0. In one embodiment, a x1 PCI Express 2.0 link is provided from the computer module 101 coupled through the connector 212 to the PCI Express switch 402 on the main circuit board 110 of the server blade 100 (see FIG. 1) to serve as the communication channel. A x1 PCI Express 2.0 channel can provide an approximately 400 Mbyte/s data transfer rate sufficient to handle the storage data transfer rate of both the local flash drive and the external SATA hard disk drive 116 for the computer module 101. The PCI Express switch 402 functions similarly to an Ethernet switching hub to direct data communication between the various PCI Express links. It provides communication between the computer modules 101 and to one or two x2 PCI Express links that couple to the switch 412 through the midplane 111 of the blade server system 400. To support fault tolerance, 2 PCI Express switches 402 can be provided on the main circuit board 110. Each of the PCI Express switches 402 has a x1 PCI Express link to each of the computer modules 101. The PCI switch 402 has a x2 PCI Express link to another PCI Express switch 412 in the chassis 401 through the midplane 111. The PCI Express switch 412 in the chassis 401 then can connect to a 10 GbE controller (not shown) for external network communication. Other embodiments are contemplated in which any combination of links of PCI Express Rev. 2 or Rev. 3 with GbE links are used to carry data within the chassis 401.

In one embodiment, input data 410 to the chassis 401 is processed by the switch 412 to obtain data distributed to each of the main circuit boards 110. Upon arrival at a main circuit board 110, the data traverses link 414. In one embodiment, the link 414 is a 10 Gigabit Ethernet link or a x2 PCI Express link. The switch 402 processes the input data to the main circuit board 410 to obtain requests. In a video streaming application, for example, these requests may be requests for on-demand video programming. These requests are then distributed by the switch 402 to the corresponding computer modules 101 via the link 404. In one embodiment, the link 404 includes 2 GbE links or a x1 PCI Express 2.0 link. Each of the computer modules 101 generates an output data stream in response to a corresponding request, where the output data stream has a first bandwidth higher than a second bandwidth of the corresponding request. For example, the output data stream may be the requested video stream. In one embodiment, the output data stream originates on the computer module 101 and traverses the link 404 to the switch 402. The switch 402 then aggregates the output data streams from the computer modules 101 to obtain output data that traverses the link 416 to the switch 412, then is output from the switch 412 as output data 420.

In one embodiment, each of the computer modules 101 is connected to the management controller 112 by a link 406. In one embodiment, the link 406 is a GbE link. The management controller 112 may be connected to an external network via links 418 and 419 and the switch 412, and may be connected to other main circuit boards 110 within the chassis 401 by the links 418 and 419. In one embodiment, the links 418 and 419 may be GbE links.

In one embodiment, remote Keyboard/Video/Mouse (KVM) functions for each computer module 101 can be supported through Ethernet communication. A Gigabit Ethernet switch 112 on the main circuit board 110 can select KVM from a particular computer module 101 by selecting data from a dedicated Ethernet link 406 (such as a 1 GbE link) from the computer module 101. An administrator on an external network can access the KVM function of each computer module 101 one at a time through the Ethernet switch 112.

Referring to FIG. 1, in another embodiment, the multiple computer module server blade 100 can be used for a multiple client blade application. Each client can be assigned to one computer module at a time, e.g. time sharing between multiple clients. To transmit compressed high performance three-dimensional (3D) graphics information from the computer module 101 to the remote client demands high network bandwidth. 3D graphics information from multiple computer modules 101 can be directed through the high speed 10 GbE switch 412. In addition, an "eight computer module" server blade has essentially eight separate computers that can be assigned individually to each of eight remote clients. If one computer module 101 fails, a client user can be switched to another computer module 101 utilizing the Ethernet switching hub 412. In one embodiment, each computer module 101 can support more than one client user at a time through virtualization.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A server blade insertable into a chassis of a blade server system, the server blade comprising:
    a main circuit board coupled to the chassis upon insertion;
    a plurality of connectors disposed on the main circuit board;
    a plurality of computer modules, each insertable into a corresponding one of the plurality of connectors; and
    a hub disposed on the main circuit board that couples to the chassis and to a communication controller included in each of the plurality of computer modules;
    wherein the hub processes input data to obtain requests distributed to the plurality of computer modules, each of the plurality of computer modules generates an output data stream in response to a corresponding request, each output data stream has a first bandwidth higher than a second bandwidth of the corresponding request, and the hub aggregates the output data streams of the plurality of computer modules to obtain output data.

2. The server blade of claim 1, wherein each of the plurality of computer modules includes:
    an integrated system chip comprising a processor and a memory controller;
    a main memory directly coupled to the memory controller;
    an input/output hub; and
    a mass storage device.

3. The server blade of claim 1, further comprising a plurality of grouped hard disk drives, wherein:
    each of the plurality of grouped hard disk drives is coupled to one or more of the plurality of computer modules; and
    each of the plurality of grouped hard disk drives includes a first hard disk drive exposed proximate to a front side of the chassis, and a second hard disk drive positioned between the first hard disk drive and a back side of the chassis.

4. The server blade of claim 3, wherein a first subset of the plurality of grouped hard disk drives is positioned proximate to a first lateral side of the server blade, and a second subset of the plurality of grouped hard disk drives is positioned proximate to a second lateral side of the server blade opposite to the first lateral side, so as to allow airflow from the front side of the chassis to pass between the first subset and the second subset.

5. The server blade of claim 4, further comprising an air baffle positioned to direct airflow that has passed between the first subset and the second subset toward the first lateral side of the server blade.

* * * * *